United States Patent Office 3,028,416
Patented Apr. 3, 1962

3,028,416
SULFONE-ESTER COMPOUNDS
John W. Lynn, Charleston, and Richard L. Roberts, Milton, W. Va., assignors to Union Carbide Corporation, a corporation of New York
No Drawing. Filed Dec. 28, 1959, Ser. No. 862,053
2 Claims. (Cl. 260—481)

This invention relates to sulfone-ester compounds as new compositions of matter, and to processes for their production.

The novel sulfone-ester compounds of this invention can be depicted by the general formula:

R—SO$_2$—CH$_2$—CH(R')—CH(R'')—COO—R''' wherein R and R''' are hydrocarbon radicals free of aliphatic unsaturation, including alkyl and aryl radicals; and R' and R'' are members selected from the group consisting of hydrogen and alkyl radicals. Preferably R and R''' are hydrocarbon radicals containing from 1 to 20 carbon atoms, and when R' and R'' are alkyl radicals, they preferably contain from 1 to 4 carbon atoms. Illustrative examples of the novel sulfone-ester compounds of this invention are such compounds as: ethyl 4-(dodecylsulfonyl)butanoate, ethyl 4-(eicosylsulfonyl)-butanoate, 2-ethylhexyl 4-(isopropylsulfonyl)butanoate, ethyl 4-(2-ethylhexylsulfonyl)butanoate, methyl 3-methyl-4-methylsulfonylbutanoate, methyl 3-ethyl-4-methylsulfonylbutanoate, ethyl 2-methyl-4-ethylsulfonylbutanoate, ethyl 2-ethyl-4-ethylsulfonylbutanoate, ethyl 4-(phenylsulfonyl)-butanoate, phenyl 4-(ethylsulfonyl)butanoate, phenyl 4-(phenylsulfonyl)-butanoate, dodecyl 4-(2-methylphenylsulfonyl)butanoate, eicosyl 4-(2-methylphenylsulfonyl)-butanoate, ethyl 2-methyl-4-(3-methlphenylsulfonl)butanoate, ethyl 2-isopropyl-4-(3-methylphenylsulfonyl)butanoate, 3-methylphenyl 3-methyl-4-(4-methylphenylsulfonyl)butanoate, 3-methylphenyl 3-isopropyl-4-(4-methylphenylsulfonyl)butanoate, propyl 4-(4-biphenylsulfonyl)-butanoate, 2-methylpropyl 4-(2-naphthylsulfonyl)-butanoate, 2,3-dimethylphenyl 4-(2-methylbutylsulfonyl)butanoate, 3,4-dimethylphenyl 4-(propylsulfonyl)butanoate, 2,5-dimethylphenyl 3-methyl-4-(ethylsulfonyl)butanoate, 2,5-dimethylphenyl 3-butyl-4-(ethylsulfonyl)butanoate, 2,5-dimethylphenyl 2-butyl-4-(ethylsulfonyl)butanoate, ethyl 4-(2-anthrylsulfonyl)butanoate, 3-phenanthryl 4-(tert-butylsulfonyl)butanoate, ethyl 4-(dodecylsulfonyl)butanoate, ethyl 4-(phenylmethylsulfonyl)butanoate, phenylmethyl 4-(ethylsulfonyl)butanoate and the like.

The novel sulfone-ester compounds of the instant invention can be produced by the oxidation of corresponding sulfide-ester compounds. The sulfide-ester compounds which can be oxidized to produce the novel sulfone-ester compounds of the instant invention can be depicted by the general formula:

R—S—CH$_2$—CH(R')—CH(R'')—COO—R''' wherein R, R', R'' and R''' are as above defined. Illustrative of such starting materials are such compounds as ethyl 5-thiaheptadecanoate, ethyl 5-thiapentacosanoate, 2-ethylhexyl 5-thia-6-methylheptanoate, ethyl 5-thia-7-ethylhendecanoate, methyl 3-methyl-5-thiahexanoate, methyl 3-ethyl-5-thiahexanoate, ethyl 2-methyl-5-thiaheptanoate, ethyl 2-ethyl-5-thiaheptanoate, ethyl 4-(phenylmercapto)butanoate, phenyl 5-thiaheptanoate, phenyl 4-(phenylmercapto)butanoate, dodecyl 4-(2-methylphenylmercapto)butanoate, eicosyl 4-(2-methylphenylmercapto)butanoate, ethyl 2-methyl-4-(3-methylphenylmercapto)butanoate, ethyl 2-isopropyl-4-(3-methylphenylmercapto)butanoate, 3-methylphenyl 3-methyl-4-(4-methylphenylmercapto)butanoate, 3-methylphenyl 3-isopropyl-4-(4-methylphenylmercapto)butanoate, propyl 4-(4-biphenylmercapto)butanoate, 2-methylpropyl 4-(2-naphthylmercapto)butanoate, 2,5-dimethyl 3-butyl-5-thiaheptanoate, 2,5-dimethyl 2-butyl-5-thiaheptanoate, 2,3-dimethylphenyl 5-thia-7-methylnonanoate, 3,4-dimethylphenyl 5-thiaoctanoate, 2,5-dimethylphenyl 3-methyl-5-thiaheptanoate, ethyl 4-(2-anthrylmercapto)butanoate, 2-phenanthryl 5-thia-6,6-dimethylheptanoate, ethyl 5-thiaheptadecanoate, ethyl 5-thia-6-phenylhexanoate, phenylmethyl 5-thiaheptanoate and the like.

The sulfide-ester compounds which can be oxidized to produce the novel sulfone-ester compounds of the instant invention can be prepared by the reaction of a suitable thiol with a suitable unsaturated ester in the presence of a free radical promoting catalyst, as disclosed in copending application Serial No. 62,080, filed concurrently herewith, which disclosure is incorporated herein by reference.

The preparation of the novel sulfone-ester compounds of the instant invention by the oxidation of sulfide-ester compounds can be illustrated by the following equation:

R—S—CH$_2$—CH(R')—CH(R'')—COO—R''' $\xrightarrow{[O]}$
R—SO$_2$—CH$_2$—CH(R')—CH(R'')—COO—R''' wherein R, R', R'' and R''' are as above defined. Thus, for example, ethyl 4-(dodecylsulfonyl)butanoate can be prepared by the oxidation of ethyl 5-thiaheptadecanoate, and ethyl 2-methyl-4-(3-methylphenylsulfonyl)butanoate can be prepared by the oxidation of ethyl 2-methyl-4-(3-methylphenylmercapto)-butanoate.

The oxidation of sulfide-ester compounds to produce the novel sulfone-ester compounds of the instant invention can be accomplished by the use of a suitable oxidizing agent, such as peracetic acid, ozone, hydrogen peroxide, sodium peroxide, potassium permanganate, and the like. Such oxidizing agents can be employed either alone or dissolved in a suitable solvent. By way of illustration, aqueous solution of hydrogen peroxide and solutions of peracetic acid in ethyl acetate are very satisfactory oxidizing agents for use in the process of the instant invention.

When a solution of the oxidizing agent is employed, the amount of oxidizing agent present in such solution can vary from as low as about 2 percent by weight to as high as 100 percent by weight, preferably from 5 percent by weight to 50 percent by weight, of the over-all weight of solution. Such oxidizing agents, whether dissolved in a solvent or not, should be employed in an amount of from as low as the stoichiometric equivalent to as high as about a 100 percent excess, preferably in an amount from the stoichiometric equivalent to a 50 percent excess, based on the sulfide-ester compound to be oxidized.

The oxidation of sulfide-ester compounds to produce the novel sulfone-ester compounds of the instant invention readily occurs at temperatures ranging from as low as 0° C. to as high as 100° C., but is preferably effected at temperatures ranging from 25° C. to 75° C.

Atmospheric pressure is usually employed in effecting oxidation according to the process of the instant invention. However, pressures both above and below atmospheric pressure, for example pressures ranging from as low as 100 mm. Hg to as high as 1000 p.s.i. can also be employed.

The oxidation of sulfide-ester compounds to produce the novel sulfone-ester compounds of the instant invention may be effected in an inert liquid solvent. By an inert liquid solvent is meant a liquid solvent in which the sulfide-ester starting material is soluble and which itself is essentially nonreactive under the conditions of the reaction. Suitable inert liquid solvents which can be employed include hydrocarbons such as hexane, cyclohexane, heptane, benzene, toluene, and the like; ethers such as isopropyl ether, ethyl ether, dioxane, tetrahydrofuran, and the like; esters such as butyl acetate, ethyl acetate, and the like; ketones such as acetone, and the like; and acids such as acetic acid, and the like. In general, an amount of solvent ranging from 0 to 10 times, preferably from 0 to 5 times, the weight of sulfide-ester compound present can be effectively employed.

The sulfonyl group present in the sulfone-ester compounds of the instant invention activates the hydrogen atoms present on the alpha carbons and thus enables these compounds to undergo various reactions, such as the Grignard reaction, to produce halomagnesium derivatives of the sulfone. These halomagnesium derivatives can then be acylated, alkylated, or halogenated. These reactions involving the hydrogen atoms present on the alpha carbons are not undergone by the corresponding sulfide-ester compounds.

The novel sulfone-ester compounds of the instant invention are useful as plasticizers for vinyl resins, such as vinyl chloride and the like.

The following examples are set forth for purposes of illustration so that those skilled in the art may better understand this invention, and it should be understood that they are not to be construed as limiting this invention in any manner.

EXAMPLE I

*Preparation of Ethyl 4-(Dodecylsulfonyl)Butanoate*

$C_{12}H_{25}-SO_2-(CH_2)_3-COO-C_2H_5$

An admixture of 238 grams (0.75 mole) of ethyl 5-thiaheptadecanoate and 500 grams of acetic acid was prepared and stirred at a temperature of 25° C. while about 660 ml. of a solution of 122 grams (1.6 moles) of peracetic acid in 511 grams of ethyl acetate were added thereto in a dropwise manner over a period of 45 minutes. After the addition was completed, the resulting mixture was stirred for an additional 2¾ hours at a temperature of 25° C., and then allowed to stand overnight at room temperature. At the end of this time, the mixture was chilled in an ice bath and filtered to remove the solid crystalline ethyl 4-(dodecylsulfonyl) butanoate which precipitated. This product was washed with cold water and then dried in a vacuum oven at a temperature of 50° C. at 5 mm. Hg pressure. About 239 grams of ethyl 4-(dodecylsulfonyl)butanoate were obtained in this manner. This represented a yield of about 91.5 percent of theoretical. The product had a melting point of 68–69° C., and was identified as ethyl 4-(dodecylsulfonyl) butanoate by chemical analysis.

*Analysis.*—Calculated for $C_{18}H_{36}O_4S$: C, 62.03%; H, 10.41%. Found: C, 62.23%; H, 10.49%.

EXAMPLE II

*Preparation of 2-Ethylhexyl 4-(Isopropylsulfonyl)-Butanoate*

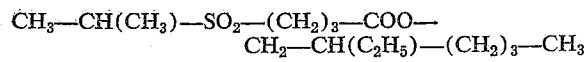

$CH_3-CH(CH_3)-SO_2-(CH_2)_3-COO-$
$CH_2-CH(C_2H_5)-(CH_2)_3-CH_3$

An admixture of 280 grams (1 mole) of 2-ethylhexyl 5-thia-6-methylheptanoate and 500 grams of acetic acid was prepared and stirred at a temperature of 25° C. while 853 ml. of a solution of 167 grams (2.2 moles) of peracetic acid in 651 grams of ethyl acetate were added thereto in a dropwise manner over a period of one hour. After the addition was completed, the resulting mixture was allowed to stand overnight at room temperature. At the end of this time, an azeotrope of ethyl acetate, acetic acid and peracetic acid was removed therefrom by distillation at a temperature of 100° C. at 0.8 mm. Hg pressure. The desired product of 2-ethylhexyl 4-(isopropylsulfonyl)butanoate which remained in the distillation flask had a specific gravity of 1.0374 (at 20° C.), an index of refraction of 1.4602 (at 30° C.), and a molecular weight of 297 (as determined by the Menzies-Wright boiling point method). About 305 grams of 2-ethylhexyl 4-(isopropylsulfonyl)butanoate, having a purity of 95.7 percent (as determined by saponification), were recovered in this manner. This represented an overall yield of about 99.8 percent of theoretical. The product was identified as 2-ethylhexyl 4-(isopropylsulfonyl)-butanoate by chemical analysis.

EXAMPLE III

*Use of 2-Ethylhexyl 4-(Isopropylsulfonyl)Butanoate as a Plasticizer*

Three samples of a resinous copolymer prepared by the bulk polymerization of a mixture containing 97.5 percent by weight of vinyl chloride and 2.5 percent by weight of vinyl acetate were admixed with a plasticizer of 2-ethylhexyl 4-(isopropylsulfonyl)butanoate and a stabilizer of dibutyltin maleate, by milling the ingredients together on a two-roll mill for five minutes at a temperature of 158° C. The milled samples were then molded for 10 minutes at a temperature of 158° C. by conventional molding techniques. The amounts of each component in each of the compositions prepared are listed below in Table A.

TABLE A

| Composition | Copolymer (grams) | 2-Ethylhexyl 4-(Isopropylsulfonyl) butanoate (grams) | Dibutyltin Maleate (grams) |
|---|---|---|---|
| A | 72.5 | 27.0 | 0.5 |
| B | 65.5 | 31.0 | 0.5 |
| C | 58.5 | 41.0 | 0.5 |

In each instance, the plasticized copolymer exhibited greater flexibility than the unplasticized copolymer, which was a stiff resin. The plasticized copolymers were evaluated in accordance with conventional testing techniques at the three concentrations, and the values were extrapolated to a "Hardness" value of 80, and then to a "Load at 100% elongation" value of 1000 p.s.i. The extrapolated figures at these two points are listed below in Table B.

TABLE B

| Property | Hardness, 80 | Load at 100% Elongation, 1,000 p.s.i. |
|---|---|---|
| Tensile Strength,[1] p.s.i. at 24.5° C | 3,060 | 2,750 |
| Elongation,[2] Percent at 24.5° C | 285 | 340 |
| Load at 100% elongation,[3] p.s.i. at 24.5° C | 1,850 | 1,000 |
| Stiffness Modulus,[4] p.s.i. at 24.5° C | 1,900 | 760 |
| Flex Temperature,[5] Tf, °C | −2 | −18 |
| T4,[6] °C | 17 | 3 |
| Brittle Temperature,[7] °C | −9 | −22 |
| Oil Extraction,[8] 10 days at 25° C., Percent | 2.0 | 11.1 |
| Water Extraction,[9] 10 days at 25° C., Percent | 4.4 | 8.6 |
| Hardness,[10] 24.5° C | 80 | 67 |
| SPI Volatile Loss,[11] 24 hours at 70° C., Percent | 5.6 | 7.2 |
| Sweatout | None | None |

[1] Determined from a stress-strain curve obtained on a Scott L-6 tensile tester operating at a constant rate of elongation of four feet per minute
[2] Determined on a Scott L-6 tensile tester operating at a constant rate of elongation of four feet per minute.
[3] Determined on a Scott L-6 tensile tester operating at a constant rate of elongation of four feet per minute.
[4] ASTM method D-747-50.
[5] ASTM method D-1043-51.
[6] ASTM method D-1043-51.
[7] ASTM method D-746-55T, Procedure A.
[8] Determined on film approximately 4-mils thick immersed in mineral oil.
[9] Determined on film approximately 4-mils thick immersed in water.
[10] ASTM method D-676-49T.
[11] ASTM method D-1203-55.

What is claimed is:
1. Ethyl 4-(dodecylsulfonyl) butanoate.
2. 2-Ethylhexyl 4-(isopropylsulfonyl) butanoate.

References Cited in the file of this patent

UNITED STATES PATENTS

| | | |
|---|---|---|
| 2,536,498 | Fraser | Jan. 2, 1951 |
| 2,640,848 | Harman | June 2, 1953 |
| 2,689,864 | Emerson et al. | Sept. 21, 1954 |
| 2,808,395 | Hill | Oct. 1, 1957 |
| 2,870,163 | Davis et al. | Jan. 20, 1959 |
| 2,892,853 | Koenig et al. | June 30, 1959 |

UNITED STATES PATENT OFFICE
CERTIFICATE OF CORRECTION

Patent No. 3,028,416

April 3, 1962

John W. Lynn et al.

It is hereby certified that error appears in the above numbered patent requiring correction and that the said Letters Patent should read as corrected below.

Column 1, line 33, for "methlphenylsulfonl" read -- methylphenylsulfonyl --; column 2, line 13, for "62,080" read -- 862,080 --; same column, line 35, for "solution" read -- solutions --.

Signed and sealed this 28th day of August 1962.

(SEAL)
Attest:

ESTON G. JOHNSON
Attesting Officer

DAVID L. LADD
Commissioner of Patents